United States Patent [19]
O'Neill

[11] 3,777,043
[45] Dec. 4, 1973

[54] APPARATUS AND METHOD FOR COOLING A REFRACTORY LINING

[75] Inventor: Raymond J. O'Neill, Alameda, Calif.

[73] Assignee: O'Neill Corporation, Alameda, Calif.

[22] Filed: Jan. 17, 1973

[21] Appl. No.: 324,250

[52] U.S. Cl. .................... 13/32, 13/35, 165/34
[51] Int. Cl. .................... F27g 3/24, F27d 1/12
[58] Field of Search ............ 13/32, 35; 432/233; 165/134, 136, 169

[56] References Cited
UNITED STATES PATENTS
| | | | |
|---|---|---|---|
| 3,190,626 | 6/1965 | Schwabe et al. | 13/35 X |
| 3,514,520 | 5/1970 | Bacchiega et al. | 13/35 |
| 2,987,788 | 6/1961 | Lyman | 165/169 X |

Primary Examiner—Roy N. Envall, Jr.
Attorney—Stephen S. Townsend et al.

[57] ABSTRACT

In a vessel for producing or refining molten metal, excessive heat is generated on top of the molten metal, resulting in excessive wear of the refractory lining of the vessel. The invention provides a plurality of channels constructed within the refractory lining and means for circulating gaseous material through each channel to cool the lining to reduce wear induced by heat. Spherical beads of refractory material can be packed in the plurality of channels to evenly distribute the flow of gaseous material throughout the channels. The invention is applicable to any refractory lining wherein heat-induced wear is a problem.

18 Claims, 4 Drawing Figures

PATENTED DEC 4 1973  3,777,043
FIG_1
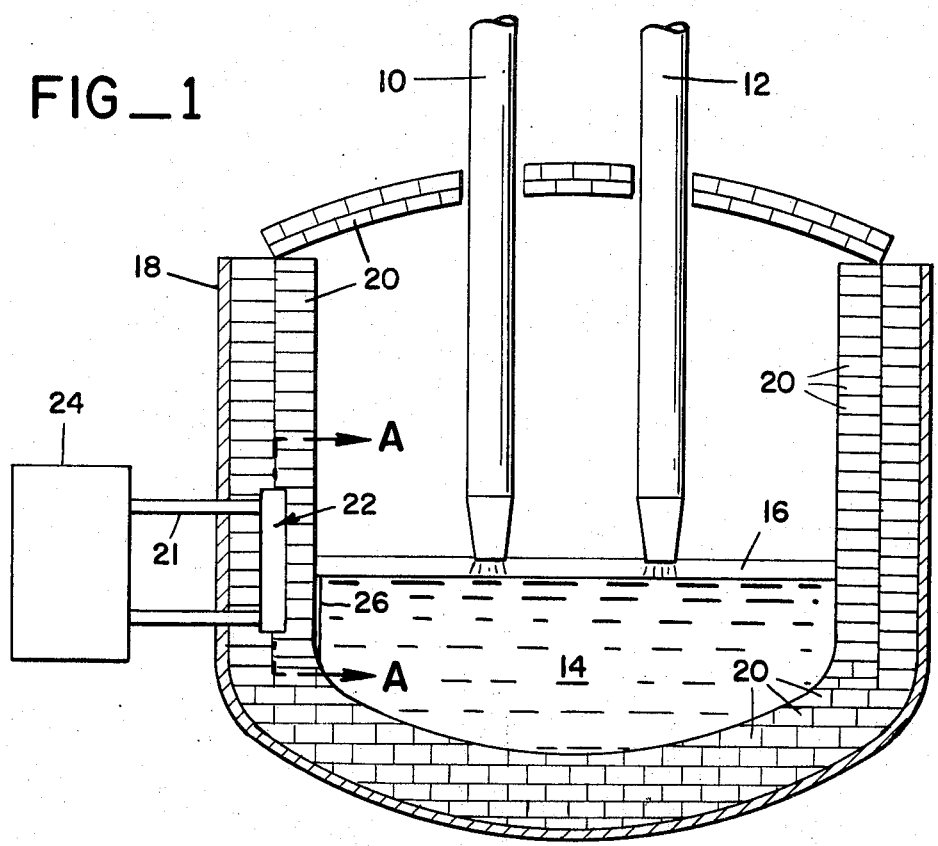
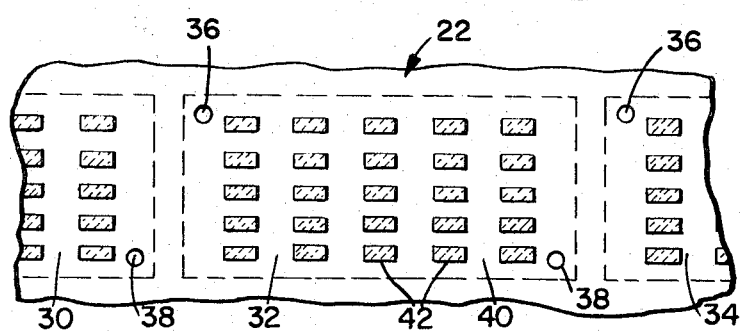
FIG_2
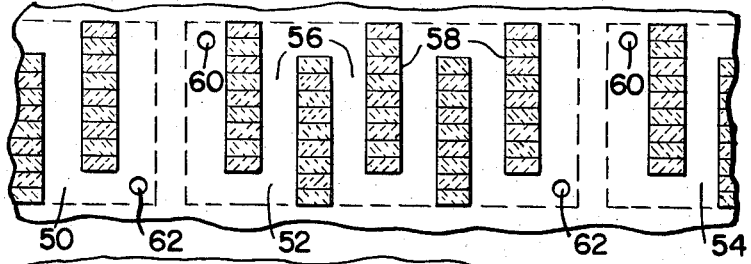
FIG_3
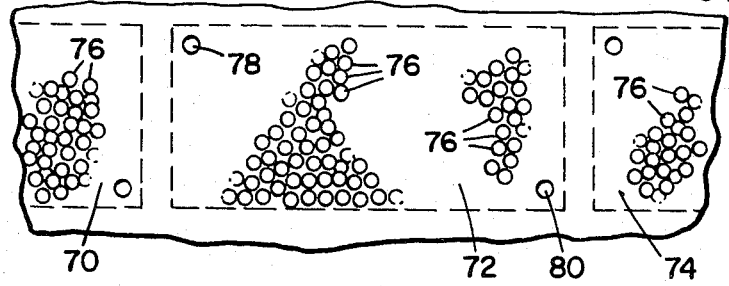
FIG_4

APPARATUS AND METHOD FOR COOLING A REFRACTORY LINING

BACKGROUND OF THE INVENTION

1. Field of the Invention

The invention relates to an improvement in refractory design, and in particular a means for cooling a refractory lining without introducing an explosion hazard.

2. Description of the Prior Art

Recent advances in the techniques of steel production have resulted in new methods which make full use of existing scrap material to produce extremely high strength steel. One significant advance is the development of a refining vessel in which the excess carbon can be removed from the steel to produce a stronger steel. A second advance has been the full utilization of arc furnaces to efficiently melt down scrap metal.

In a refining vessel, steel is maintained in its molten state, and gas is bubbled through the molten steel. When the gas reaches the top surface of the molten layer, it oxidizes the carbon so that the carbon is burned off. This is an efficient means for removing excess carbon from the steel, but it imposes a severe temperature environment on the inside of the vessel.

The use of arc furnaces for the production of steel and other heavy metals has been receiving increased attention of late. Arc furnaces are readily adapted to work with scrap metal, and the recent emphasis on recycling scrap material rather than using newly mined ore has greatly increased the use of arc furnaces. In an arc furnace, two critical heat zones exist. The first critical zone is adjacent the slag layer which forms on top of the molten metal. The slag layer contains chemicals which erode the furnace lining, and the slag layer is also heated by the arc drawn from the molten metal to the electrodes. The second critical heat zone is the area above the slag layer which is heated by radiation from the electrode arc. The arc furnace and the refining vessel have similar problems in that a severe heat load is imposed on the refractory lining above the molten metal.

Attempts have been made to cool the refractory lining on the interior of a refining vessel or an arc furnace by water-cooling. However, the introduction of water or any other liquid in an area near the hot interior results in a severe explosion hazard. In fact, the use of water-cooling in such applications has recently resulted in explosions which have cost several lives. The present invention provides for cooling the refractory lining with a gas to avoid the possibility of an explosion hazard.

SUMMARY OF THE INVENTION

The invention relates to a vessel in which intense heat is generated. A casing forms the outer shell of the vessel and a refractory layer lines the interior of the casing. A channel is provided in the refractory layer, and means are provided to circulate gaseous material through that channel.

The invention specifically relates to methods of controlling the circulation of the gaseous material through the channel to promote uniform cooling of the refractory layer. The channel may be annular to confine the cooling action to the region where it is most necessary, e.g., the slag layer. To insure uniform cooling throughout the annular region, the channel may be divided into independent sections, and means provided to circulate gaseous material through each section. In this manner, each circumferential section of the annular channel is equally cooled to prohibit excessive wear in any part of the annular region.

Various methods are provided for distributing the flow of gaseous material throughout each channel section so that "dead zones" are not formed in which little cooling action occurs. Distribution of flow is accomplished by using variable length bricks which interrupt the flow or provide a tortuous path therefor, or by packing the channel sections with particulate material. Either of the above methods serve to guide the flow of the gaseous material so that it flows substantially evenly throughout the channel section to provide uniform cooling of the refractory layer.

As a further embodiment, particulate material may be used to pack a singular annular channel to improve cooling of the refractory layer. Particulate material is especially advantageous since heat from the refractory lining is readily transferred to the particles, and the flow of the gaseous material around each particle facilitates transfer of heat to the gas. The particulate material may also be fused to provide a more compact mass and increase structural rigidity while still allowing passage of gaseous material therethrough.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a side cross sectional view of an arc furnace embodying the present invention.

FIG. 2 is a view taken along lines A—A of FIG. 1 as that view would appear to illustrate a first embodiment of the invention.

FIG. 3 is a view similar to that of FIG. 2 illustrating a second embodiment of the present invention.

FIG. 4 is a view similar to that of FIGS. 2 and 3 illustrating yet a third embodiment of the present invention.

DESCRIPTION OF THE PREFERRED EMBODIMENTS

A standard arc furnace embodying the present invention is illustrated in cross section in FIG. 1 to provide an example of how the present invention would be used. Electrodes 10 and 12 extend to a point adjacent molten material 14. Arc furnaces are normally used in the production of molten steel, but can be used in the production of other heavy metals which are electrically conductive. A slag layer 16 is formed on top of the molten material 14.

An arc furnace ordinarily has a metal casing 18 forming the outer shell of the furnace, and a refractory brick layer 20 is used to line the interior of the metal casing. Arc furnaces are customarily constructed with a solid brick lining, but the present invention provides an included channel 22 in the interior of the brick lining 20. The channel 22 is in communication with a chamber 24 which circulates a gas through the channel 22. In this manner, the refractory lining adjacent the channel 22 is cooled by the passage of air therethrough. This cooling may be sufficient to freeze the metal in the vicinity of the chamber 22 to form a thin layer of solid metal 26 to further insulate the bricks from the molten metal. However, it is not essential that such a frozen layer 26 be formed.

In FIG. 1, the channel 22 is located adjacent the slag layer 16. Since the slag layer is the most critical wear region in an arc furnace, any employment of such a cooling mechanism would probably include the slag area. However, the present invention is not necessarily limited to the slag area, and a channel similar to that illustrated could be located elsewhere in the lining of the arc furnace. Radiation from the electrodes 10 and 12 also causes substantial wear of the brick lining 20 on the upper side walls and roof of the arc furnace. Hence, it may be desirable to locate additional channels elsewhere in the brick lining 20 of the arc furnace. Furthermore, the invention is not limited to arc furnaces but applies to all refractory linings.

It is essential for the purposes of the present invention that a gaseous material be circulated through the channel 22. However, the particular gas used is not critical and air at room temperature may be circulated through the channel. However, to enhance the cooling effect of the gas, a highly cooled, preferably inert gas may be used. For example, liquid helium may be vaporized in chamber 24 and then passed through the channel 22. However, liquid of any kind must be prevented from entering the chamber 22 since it would present a severe explosion hazard near the high termperature environment of the furnace interior.

In FIG. 1, the channel 22 illustrated was basically unobstructed. However, to more fully circulate the gas throughout the channel 22, such an unobstructed opening would probably not be desirable. A preferred embodiment of the actual construction of the channel 22 is illustrated in FIG. 2. The view of FIG. 2 is taken along cut A—A of FIG. 1, as that view would appear in the first preferred embodiment.

As shown in FIG. 2, the channel 22 is divided into independent sections 30, 32 and 34. A separate gas inlet 36 and outlet 38 are provided for each section. In the embodiment of FIG. 2, the channel is formed by the spacing left between adjacent shorter length bricks 40, and is interrupted by longer length bricks 42. In this manner, the flow of the gaseous material through the channel section is dispersed throughout the channel section to obtain uniform cooling.

A view similar to that taken in FIG. 2, along cut A—A of FIG. 1, but illustrating a second preferred embodiment, is illustrated in FIG. 3. In this embodiment, the channel 22 is also divided into sections 50, 52, and 54. A combination of shorter and longer length bricks is again used, but the shorter length bricks form a continuous channel 56 which winds around offset rows of longer length bricks 58 to disperse a flow of air throughout the channel section. An inlet 60 introduces gaseous material at one end of the maze and an outlet 62 exhausts the gaseous material from the other end of the maze.

A still further embodiment of the present invention is illustrated by way of reference to FIG. 4. In FIG. 4, a view similar to that in FIGS. 2 and 3, taken along cut A—A of FIG. 1, is used, but a third preferred embodiment of the channel 22 is illustrated. In this embodiment the channel 22 is again divided into sections 70, 72 and 74. However, this embodiment does not require the use of variable length bricks. Instead, the channel sections 70, 72 and 74 are filled with beads or particles 76 of refractory or other material. The beads may be ceramic, metallic or glass, and although refractory material is preferred, non-refractory beads could be used if able to remain solid in the ambient temperature environment. Particulate matter of any shape and size may be used, but spherical beads having diameters from one-fourth to 2 inches are preferred. The function of the beads is to disperse the flow of gaseous material throughout channel section 72 as it passes from the inlet 78 to the outlet 80. The beads may be fused together to provide a compact mass, and also may be fused to the bricks to provide additional structural strength to the refractory lining. The fusing is controlled so that sufficient space is left between the beads to allow for passage of gaseous material therethrough. The use of refractory beads provides additional refractory capacity of the brick lining itself, as well as distributing the air throughout the channel section 72. Heat will be transferred from refractory bricks in communication with the interior of the arc furnace to the refractory beads 76. The gaseous material will flow over each bead individually, thus providing an efficient means for transferring heat from a refractory material to the cooling gas.

The specific embodiments of the channel 22 illustrated in FIGS. 2, 3 and 4 are not intended to delimit the invention, but more fully to illustrate specific applications. An arc furnace has been used for illustrative purposes, but the invention applies to any refractory lining wherein it is desirable to cool the lining. It is probable that in actual practice, no one of the specific embodiments shown will be used individually. It is probable that a combination of the embodiments, particularly the use of the refractory beads of FIG. 4 in combination with an alternating brick structure of FIGS. 2 or 3, would provide the most efficient cooling system.

What I claim as new is:

1. A vessel for the containment of intense heat comprising:
   a casing forming the outer shell of the vessel;
   a refractory layer lining the interior of the casing, said layer having an included annular channel; and
   means for circulating gaseous material through the channel to cool the refractory layer.

2. A vessel as recited in claim 1 wherein the annular channel is comprised of independent channel sections and wherein means are provided for circulating gaseous material through each said section.

3. A vessel as recited in claim 1 and additionally comprising refractory bead packing in the annular channel to control flow of the gaseous material therethrough.

4. A vessel as recited in claim 3 wherein the bead packing is fused to rigidly interconnect the beads but allow passage of gaseous material through the packing.

5. A vessel as recited in claim 1 wherein the gaseous material is air.

6. A vessel as recited in claim 1 wherein the gaseous material is an inert gas at a temperature slightly above the boiling temperature of said gas.

7. A vessel for producing molten metal wherein intense heat is generated on top of said molten metal, said vessel comprising:

a metal casing forming the outer shell of the vessel;

a refractory brick layer lining the interior of the metal casing, said brick layer comprised of variable length bricks to provide a channel within the brick layer, said channel formed by the spaces left by adjacent shorter length bricks, said channel interrupted by intermediate longer length bricks; and means for circulating gaseous material through the channel to cool the refractory layer.

8. A vessel as recited in claim 7 wherein the channel is formed adjacent the critical heat zones of the vessel.

9. In a vessel for producing or refining molten metal, said vessel having a refractory lining, the improvement comprising:

a plurality of channels constructed within the lining; and means for passing gaseous material through each channel to cool the refractory lining.

10. A vessel as recited in claim 9 and additionally comprising means within each channel for guiding the flow of the gaseous material through each channel to fully distribute the flow of the gaseous material throughout each said channel.

11. In a vessel for producing or refining molten metal, said vessel having a refractory lining, the improvement comprising:

porous material disposed within the refractory lining; and means for circulating relatively cold gaseous material through the porous material to cool said material.

12. In a vessel for producing molten metal, said vessel having a refractory lining, the improvement comprising:

substantially spherical beads of refractory material packed in an interior opening in the refractory lining, and means for passing gaseous material over the spherical beads packed in the interior opening to cool said spherical beads.

13. A vessel as recited in claim 12 wherein the beads are fused to each other to interconnect the beads but allow passage of gaseous material therethrough.

14. A vessel as recited in claim 13 wherein the beads are additionally fused to the brick lining.

15. In a method for producing molten metal, said method comprising melting scrap metal by striking an electric arc from the scrap metal to the electrodes in a furnace lined with refractory bricks, the improvement comprising:

providing at least one channel within the refractory brick lining:

circulating gaseous material through at least said one channel formed in the refractory brick lining to cool said lining.

16. The method as recited in claim 15 wherein the gaseous material is independently circulated through a plurality of channels in the refractory brick lining.

17. In a refractory lining exposed to extreme temperatures comprising a layer of refractory bricks, the improvement comprising:

a section of fused refractory beads internal to the refractory brick layer; and means for passing a gaseous material through the section of refractory beads to cool said beads.

18. A refractory lining as recited in claim 17 wherein the fused refractory beads are fused to the refractory bricks to improve structural rigidity thereof.

* * * * *